No. 615,616. Patented Dec. 6, 1898.
I. N. GLAUBER.
MEANS FOR SECURING WASHERS ON PLUG VALVES.
(Application filed Jan. 13, 1898.)
(No Model.)
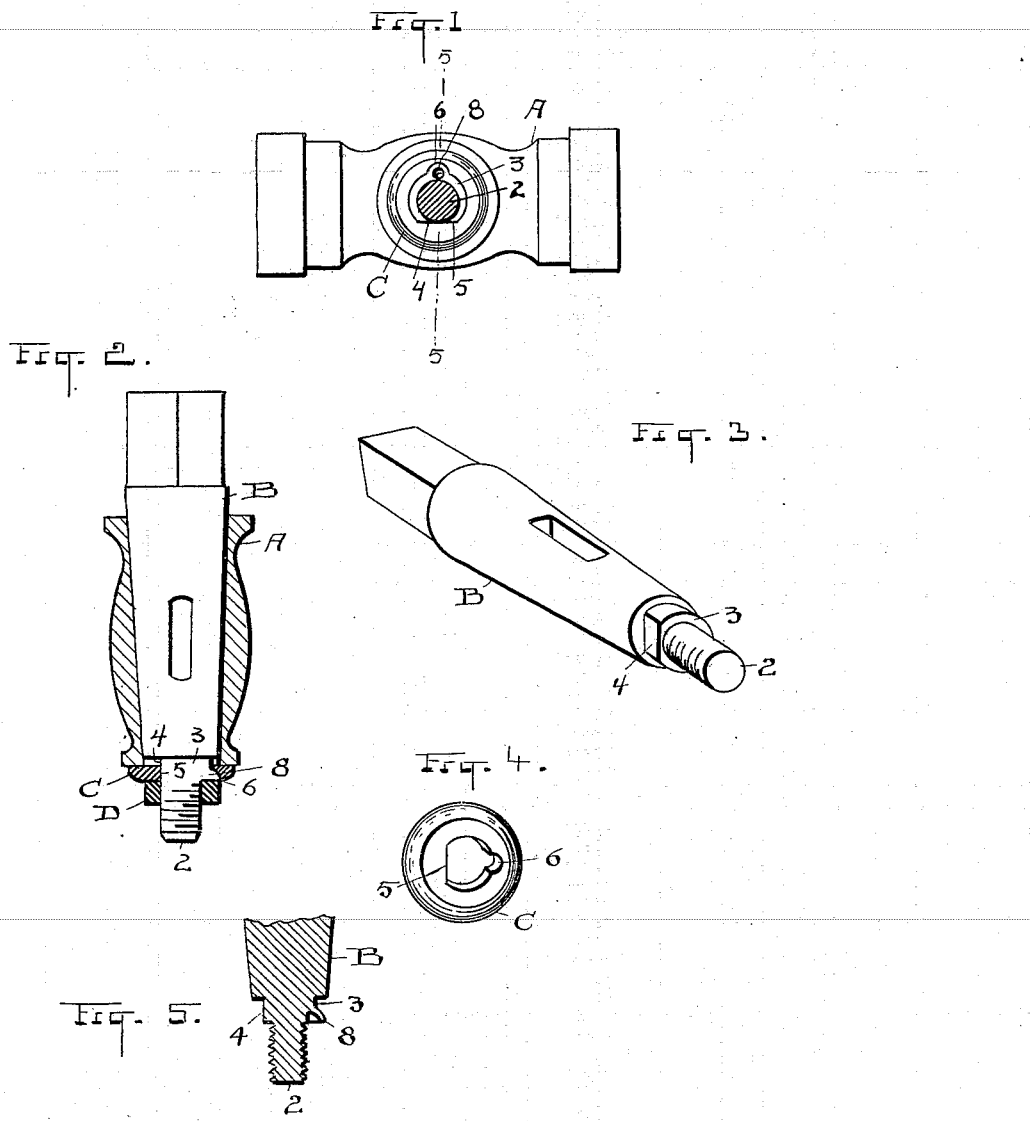

UNITED STATES PATENT OFFICE.

ISAAC N. GLAUBER, OF CLEVELAND, OHIO.

MEANS FOR SECURING WASHERS ON PLUG-VALVES.

SPECIFICATION forming part of Letters Patent No. 615,616, dated December 6, 1898.

Application filed January 13, 1898. Serial No. 666,510. (No model.)

*To all whom it may concern:*

Be it known that I, ISAAC N. GLAUBER, a citizen of the United States, residing at Cleveland, in the county of Cuyahoga and State of Ohio, have invented certain new and useful Improvements in Means for Securing Washers on Plug-Valves; and I do declare that the following is a full, clear, and exact description of the invention, which will enable others skilled in the art to which it appertains to make and use the same.

My invention relates to improvements in means for securing washers on plug-valves and the like; and the invention consists in a plug-valve or such like device which has a washer fixed to rotate therewith, all substantially as shown and described, and particularly pointed out in the claims.

In the accompanying drawings, Figure 1 is a bottom view of a valve-casing—such, for example, as is used for stop and waste valves, water-valves, steam or gas valves, and the like, though the matter of use is immaterial and the invention may be used wherever it is found desirable. Fig. 2 is a cross-section of Fig. 1 substantially on line 5 5 and showing an elevation of the plug therein and a cross-section of the washer and nut on the stem of the plug or valve in cross-section. Fig. 3 is a perspective view of the plug or valve separated from the casing. Fig. 4 is a plan view of a washer alone constructed according to my invention; and Fig. 5 is a sectional elevation of the lower portion of the plug or valve as it appears when the washer is secured after the manner of my invention, this view being taken directly on line 5 5, Fig. 1, but omitting the casing.

In the accompanying drawings, A represents the casing; B, the plug; C, the washer, and D the nut. These several elements without my improvements are each and all well known and their arrangement relatively, as shown, likewise is well known and common. So, also, is it common to fashion the threaded stem 2 of the plug with a head 3, having a flat straight portion 4 and in cross-section resembling the letter D, and to form a corresponding straight portion 5 in the washer C, which is adapted to fit upon the head 3 and rotate therewith; but hitherto there has been constant annoyance from this construction because it was practically impossible to get the washer onto the stem so that it would not have more or less rotary play or movement thereon, and since the washer bears against the casing and the nut against the washer it followed that any looseness of washer would at once tell when the plug was rotated and the nut would be turned and loosened thereby and a leaky plug would soon be the result. Various expedients have been resorted to from time to time to remedy this defect of construction and operation; but so far as I know all of them have been unsatisfactory on one account and another, and hence the present invention.

In my invention I utilize all the old parts assembled and constructed as before, with this difference, that at some point in the edge of the opening in or through the washer C, I form one or more recesses, notches, or depressions 6. Then when the washer is placed in working position and before the nut D is threaded onto the plug I take a sharp-pointed tool or instrument and strike the point into the head 3 opposite the recess or notch 6, so as to throw the adjacent stock (indicated by 8, Fig. 5) into said notch or recess, as seen in Fig. 2. There is sufficient of this stock forced into said recess to fill the same and effectually lock the washer on the plug, and hence it follows when the plug is turned the washer will turn promptly with it and not be held by the casing until the looseness is taken up, as formerly. The nut D, having its bearing against the washer, will of course turn with it and the plug, and thus these three parts are held tightly together and the washer is made to subserve its original and only purpose, but in which it has hitherto failed or been materially defective, for the reasons hereinbefore set forth. Then, again, it frequently occurs that the thread on the spindle 2 is so cut as to cause an uneven or one-sided bearing of the nut against the washer, and this under the old imperfect fitting of the washer on the plug would cause the washer to tilt and produce a very unsatisfactory engagement of the parts; but by my improvement the washer is so firmly secured that tilting it is impossible.

The cavity 6 in the washer affords shoulders for engagement with the stock 5, that is thrown out into the cavity or notch, and this notch or cavity is in the inner edge of the washer and in this instance is opposite the straight portion 4, so as to cause the washer to lock firmly on said shoulder. The cavity may, however, be in any portion of the edge of the opening through the washer and one or more cavities be used, as preferred.

The washer, as shown, is adapted to plugs as heretofore made and may be substituted for the well-known D-washer common to the trade. It is therefore made and sold as a separate article of manufacture and trade.

What I claim is—

1. The casing, a rotatable member in said casing constructed to receive a washer, and a washer having a D-opening through which it is engaged on said member and a cavity in the edge of said opening locked on said member, substantially as described.

2. The casing, and the rotatable member having a flat portion on its lower end, in combination with the washer having a straight portion to engage said flat portion and a cavity in its inner edge, and a portion of the stock of the said rotatable member occupying said cavity, substantially as described.

3. The casing, and the plug having a substantially D-shaped portion for engaging a washer and a threaded stem below the same, in combination with a D-washer fitting said D portion and having a notch in its edge and a portion of the stock of the plug engaged in said notch, and a nut on said stem bearing against said washer, substantially as described.

Witness my hand to the foregoing specification this 6th day of January, 1898.

ISAAC N. GLAUBER.

Witnesses:
H. T. FISHER,
R. B. MOSER.